United States Patent Office 2,841,483
Patented July 1, 1958

2,841,483

HERBICIDAL CHEMICAL COMPOSITIONS

Arthur W. Swezey, Garden Grove, and Robert W. Nex, Bellflower, Calif., assignors to The Dow Chemical Company, Midland, Mich., a corporation of Delaware No Drawing. Application March 5, 1953
Serial No. 340,667

8 Claims. (Cl. 71—2.3)

This invention is concerned with agricultural chemical compositions and is particularly directed to concentrate and spray compositions comprising 2,4-dinitro-6-alkyl-phenol compounds.

The 2,4-dinitro-6-alkyl-phenols and their salts have been widely employed as herbicidal toxicants in the preparation of compositions for the control of undesired vegetation. The fields of application of these products have been many, with particular emphasis in use being predicated upon their relative specificity for broadleafed vegetation. Thus, aqueous compositions containing the dinitro-phenolic compounds have been utilized as selective herbicides for controlling broadleafed weeds in grains and other economic crops such as peas and alfalfa having tolerance for the nitro-phenolic toxicants in the compositions employed.

Also, formulations have been prepared comprising the dinitro-phenolic compounds in mixture with certain carriers, wetting and dispersing agents, and particularly with relatively high volumes of liquid solvents of petroleum origin, and employed with some success in general plant growth control programs for the killing of both broad-leafed and narrowleafed plant species. Here, however, the relatively low toxicity of the dinitro-phenolic toxicants to grasses and the like has constituted a significant limiting factor in that the injury of graminaceous plants has frequently been superficial. Thus, an apparent economic control of mixed vegetation sometimes has constituted only a top-burning of the mature leaves of monocotyledonous species, followed by a recovery of the burned vegeation from the unaffected growing points.

It is an object of the present invention to provide a new composition of matter in the form of an agricultural chemical concentrate adapted subsequently to be readily diluted with water to produce spray compositions comprising 2,4-dinitro-6-alkyl-phenols, which spray compositions have utilities not characterizing previously known dinitro-phenolic mixtures. It is a further object to provide a composition comprising a 2,4-dinitro-6-alkyl-phenol and an additament which composition is characterized by the synergistic activity of its components in matters pertaining to biochemical control. Other objects will become apparent from the following specification and claims.

It has been found in accordance with the present invention that certain 2,4-dinitro-6-alkyl-phenols may be compounded with polyglycol alkyl ether-alcohols to obtain novel agricultural chemical compositions which are characterized by unexpected utility upon dilution with water. The concentrates themselves are thick viscous liquids which disperse readily in water to produce spray mixtures which do not require continued mechanical agitation following the initial dispersion. Further, in many instances, the dinitro-phenolic constituent is solubilized in the water of dilution, and generally no further wetting or dispersing agent is required to obtain and maintain stable and homogeneous spray mixtures. The dilute aqueous spray mixtures are valuable for many agricultural uses including insecticidal, fungicidal, miticidal and herbicidal application, and particularly the latter since the combination of materials accomplishes a significant enhancement of the toxicity of the dinitrophenolic constituent against plant growth and particularly graminaceous plants. This enhancement of toxicity is of an order to obviate the necessity for using oils in combination with the dinitro-phenols to accomplish control of grasses. This is not only a significant economic advantage, but also permits the use of the dinitro-phenols for the control of grasses in and about corps which do not ordinarily tolerate oil. The polyglycol alkyl ether-alcohol compounds appear to serve as synergists for the nitro-phenol whereby unpredictable and greater than additive results are obtained with spray mixtures containing the compositions of the invention, and particularly in herbicidal application.

The 2,4-dinitro-6-alkyl-phenols with which the invention are concerned are those of the formula

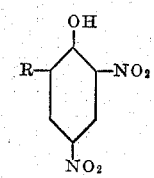

wherein R represents an alkyl radical of from 3 to 5 carbon atoms, inclusive. It is to be understood in the generic teaching of the present specification and in the claims, that reference to "2,4-dinitro-6-alkyl-phenols" is to be considered as inclusive of those amine, ammonium, and inorganic salts of such phenols as are compatible with the polyglycol alkyl ether-alcohol constituent of the claimed compositions.

The polyglycol alkyl ether-alcohols employed as constituents of the present invention are those of the formula

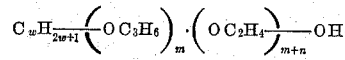

wherein $w$ represents from 12 to 16, inclusive, $m$ represents from 0 to 5, inclusive, and $n$ represents from 3 to 10, inclusive, and the total number of alkylene-oxide groups in the molecule is between 9 and 13, inclusive. That portion of the molecule designated as

is inclusive of dodecyl, tridecyl, tetradecyl, pentadecyl and hexadecyl radicals.

While any satisfactory and operable amounts of the dinitro-phenolic compound and of the polyglycol alkyl ether-alcohol may be employed, the molar proportions of the components in the compositions of the invention are believed critical. Thus, to constitute a composition of optimum utility under the present invention, at least 4 molecular proportions by weight (moles) of the polyglycol alkyl ether-alcohol should be present for each mole of the 2,4-dinitro-6-alkyl-phenol. A practical upper limit is about 21 moles of the polyglycol alkyl ether-alcohol per mole of the dinitro-phenol, and a preferred range over which good results have been obtained is from 5 to 12 moles of the ether-alcohol compound per mole of dinitro-phenol.

The precise amount of the concentrate employed to accomplish a given herbicidal result is somewhat dependant upon the exact composition of the mixture within the described limits. Thus the minimum dosage, in pounds of 2,4-dinitro-6-alkyl-phenol per acre required to accomplish a satisfactory herbicidal control is inversely proportional to the mole ratio of the polyglycol alkyl ether-alcohol synergist to 2,4-dinitro-6-alkyl-phenol present in the mixture.

When operating in accordance with the invention, the primary composition is preferably a concentrate, but dilute aqueous sprays may be compounded directly if desired. In the preparation of the concentrate, the 2,4-dinitro-6-alkyl-phenol may be melted and the polyglycol alkyl ether-alcohol compound poured into the molten phenol with stirring to obtain a homogeneous mixture. Alternatively the molten phenol may be added to the polyglycol compound, or the two materials may simply be mixed together and warmed and stirred. In either event, a viscous liquid product is obtained from which there appears to be little or no tendency for the separation of constituents. Such a concentrate is simply poured into water with stirring to accomplish the preparation of relatively stable dilute spray mixtures.

The direct preparation of dilute spray mixtures is somewhat more difficult and less desirable. It may involve the use of supplemental organic solvents and dispersing agents to accomplish the blending and association together of the dinitro-phenolic and polyglycol alkyl ether alcohol constituents.

In field application, the minimum operating dosage of the 2,4-dinitro-6-alkyl-phenol in the compositions of the invention is approximately 0.25 pound per acre of area to be treated. Such dosage would be effective against small seedling growth. The lower practical range begins at about 0.5 pound per acre. These dosages of materials are ordinarily applied in from 30 to 300 gallons of spray per acre, with about 100 gallons of spray being the preferred volume. In air application and for specialized usages, the volume of spray material may be as low as 10 to 15 gallons per acre. In each instance above, somewhat higher volumes may be desirable and necessary in situations involving dense overgrown weeds. Contact of the foliage is essential, and must be considered in determining mode of application, dosages and spray volumes.

Conditions may arise where the inclusion of supplemental wetting and dispersing agents may prove desirable. Similarly co-solvents such as aromatic oils or other suitable organic liquids may sometimes be employed. Also, other additaments such as dyes or toxicants such as herbicidal oils may find use in specialized situations.

The preparation of the polyglycol alkyl ether-alcohol compounds employed in accordance with the invention may be accomplished by successively reacting a molar proportion of a suitable long chain alkanol with from 0.1 to 0.25 mole of metallic sodium or alkali metal hydroxide and thereafter with a suitable molar proportion of ethylene oxide or of ethylene and propylene oxides. Where ethylene oxide alone is to be incorporated in the molecule, either 9 or 10 molar proportions are employed. Where a compound is being prepared to contain both ethylene and propylene oxide structures, the alcohol-alcoholate intermediate is first reacted with from 1 to 5 moles of propylene oxide and thereafter with an amount of ethylene oxide at least equal to the moles of propylene oxide employed and sufficient that the total number of alkylene oxide groups in the ultimate molecule be between 9 and 13, inclusive. The reaction of the intermediate with the alkylene oxides, is carried out under autogenous pressure at 100°–150° C. The crude reaction product obtained may be purified as by blowing with carbon dioxide and treating with water to remove residual alkali, clarification, filtration, low temperature distillation under reduced pressure to remove water and traces of low boiling constituents, etc. The resulting products are viscous liquids at room temperature, soluble in aromatic oils, and readily dispersible in water. In aqueous solution, they accomplish a significant lowering of surface tension and so function as wetting and dispersing agents.

Preferred embodiments of the invention include compositions comprising as the dinitro-phenolic toxicant, 2,4-dinitro-6-secondarybutyl-phenol, ammonium, 2,4-dinitro-6-secondarybutyl-phenolate, and alkanolamine salts of 2,4-dinitro-6-secondarybutyl-phenol and particularly the triethanolamine salt. Preferred polyglycol alkyl ether-alcohol compounds are those produced from either tridecyl alcohol or hexadecyl alcohol.

The following examples illustrate the invention but are not to be construed as limiting the same:

EXAMPLE 1

A concentrate was prepared from 2,4-dinitro-6-secondarybutyl-phenol and a polyglycol alkyl ether-alcohol obtained by the condensation of one mole of tridecyl alcohol with 9 moles of ethylene oxide. This reaction was carried out by first reacting the tridecyl alcohol with 0.1 mole of metallic sodium at 100° C. under a blanket of nitrogen at atmospheric pressure, and thereafter condensing the mixed alcohol-alcoholate product with the ethylene oxide at 130°–150° C. under autogenous pressure in a closed system. The resulting product was blown with carbon dioxide, washed with water and dried to obtain a tridecyl ether-alcohol product as a viscous liquid melting at 6°–8° C., and having a density of 25°/25° C. of 1.002 and a refractive index $$\left(n\frac{25°}{D}\right)$$

of 1.459.

The concentrate was prepared by melting 1.0 mole of the dinitro-phenol and adding 6.44 moles of the ether-alcohol thereto with stirring. It was a viscous liquid containing 0.5 pound of the dinitro-6-secondarybutyl-phenol per gallon. A portion of the concentrate was stirred into water to obtain a dilute aqueous spray mixture of 2,4-dinitro-6-secondarybutyl-phenol and having a content of 3 gallons of the original concentrate per 100 gallons of the spray. The 2,4-dinitro-6-secondarybutyl-phenol appeared to be in true solution in the mixture. The dilution was accomplished in the tank of a conventional motor-driven spray rig equipped with hand boom and provided for mixing by continuous recirculation of the tank contents. The spray mixture was stable.

The spray mixture was applied uniformly over portions of a very dense mixed stand of oats 4 to 14 inches high, common field mustard 10 to 12 inches high, annual yellow clover 10 to 12 inches high, knot weed 3 to 5 inches high, and malva 3 to 16 inches high, at a rate of 100 gallons per acre under a spray pressure of 90 pounds per square inch using a flat-fan spray nozzle. The day was partly cloudy with temperature of 65°–70° F. The spray areas had been thoroughly wetted by rain 48 hours previously and were rained on again within 24 hours following treatment. Excellent wetting of the surfaces of all plant species was obtained with the spray mixture.

Nine days after spraying the plots were examined. Kills of 98 percent against oats, 72 percent against malva, 93 percent against knot weed, 100 percent against mustard and 100 percent against yellow clover were observed. Vegetation in unsprayed areas continued in a luxuriant state of growth.

EXAMPLE 2

In an exactly similar manner the tridecyl ether-alcohol as described in Example 1 was compounded with 2,4-dinitro-6-secondarybutyl-phenol to obtain a concentrate containing 4.6 moles of the ether-alcohol per mole of the dinitro-phenol compound. This concentrate was diluted with water to obtain an aqueous dispersion comprising 3 gallons of the original concentrate per 100 gallons of the ultimate spray.

The spray mixture was applied as described in the preceding example against oats, field mustard, yellow clover, and knot weed to obtain controls over a 9 day period of 98 percent, 95 percent, 100 percent and 73 percent, respectively.

EXAMPLE 3

0.1 mole of finely divided metallic sodium was added to tridecyl alcohol and reacted therewith under a blanket of nitrogen at atmospheric pressure and a temperature of 100° C. The resulting alcohol-alcoholate mixture was thereafter successively reacted with 5 moles of propylene oxide and 8 moles of ethylene oxide in a closed reaction vessel under autogenous pressure and at a temperature range of 130°–150° C. The resulting product was blown with carbon dioxide, washed with water and dried to obtain a tridecyl ether-alcohol product as a viscous liquid melting at 0°–3° C., and having a density of 0.985 at 25°/25° C. and a refractive index $$\left(n\frac{25°}{D}\right)$$

of 1.453.

One mole of 2,4-dinitro-6-secondarybutyl-phenol was melted and 18.7 moles of the above polyglycol ether-alcohol product added thereto with stirring to produce a concentrate composition comprising 0.125 pound of 2,4-dinitro-6-secondarybutyl-phenol per gallon. This concentrate was diluted with water to obtain a spray mixture containing 1 gallon of concentrate per 100 gallons of the ultimate aqueous spray. A stand of canary rye grass (*Phalaris canariensis*), 3½ to 4 inches high, in vigorous growth and moderate stand was thoroughly wetted with the dilute spray composition. The temperature at time of application was 65°–70° F. and the operation was carried out in 6 replications. Six days after treatment, the several plots were examined and a 95 percent kill of canary rye grass observed in the areas subjected to the described treatment. Control areas continued in a vigorous state of growth.

EXAMPLE 4

One mole of the triethanolamine salt of 2,4-dinitro-6-secondarybutyl-phenol and 4.0 moles of the polyglycol ether-alcohol as described in Example 3 were warmed and stirred together to obtain a concentrate composition containing the equivalent of 0.58 pound of 2,4-dinitro-6-secondarybutyl-phenol per gallon. This concentrate was diluted with water to obtain a spray mixture comprising 5 gallons of the concentrate in 75 gallons of ultimate aqueous dispersion.

The above aqueous spray mixture was applied by knapsack type sprayer equipped with a 2-nozzled flat-fan hand-boom operating at 45 pounds per square inch pressure, for the control of water grass 3 to 6 inches high and in moderate stand both under and adjacent to the foliated trees of a mature olive grove. The sprayed plots were in triplicate. Application was made at an air temperature of 85°–90° F. and at a volume of 75 gallons per acre. The water grass (*Echinochloa, crus—Galli*) was under some moisture stress at time of application. Eight days after treatment both treated and untreated areas of the olive grove were inspected. Unsprayed areas continued in a moderate state of growth. The kill of water grass in the sprayed areas amounted to 90 percent. No unfavorable reaction of the olive trees attributable to the spray treatments was observed.

EXAMPLE 5

One mole of 2,4-dinitro-6-secondarybutyl-phenol and 5.7 moles of the polyglycol ether-alcohol of Example 1 were warmed and stirred together to obtain a concentrate containing 0.58 pound of 2,4-dinitro-6-secondarybutyl-phenol per galon. Five gallons of this concentrate was diluted with water to obtain 75 gallons of spray mixture. The latter was applied exactly as described in Example 4 for the control of water grass adjacent to and in the shaded area of the trees of a mature olive grove. The conditions of application and equipment were as described in Example 4. Eight days after treatment, the areas sprayed at the rate of 75 gallons of diluted spray per acre evidenced a 99 percent kill of the water grass. Check areas continued in a moderate state of growth and the trees adjacent to the sprayed area appeared unaffected by the treatment.

EXAMPLE 6

One mole of the ammonium salt of 2,4-dinitro-6-secondarybutyl-phenol and 6.4 moles of the polyglycol ether-alcohol described in Example 1 were warmed and stirred together to obtain a concentrate containing the equivalent of 0.5 pound of 2,4-dinitro-6-secondarybutyl-phenol per gallon. This concentrate was diluted with water to form a spray mixture containing 1 gallon of concentrate per 100 gallons of mixture. This aqueous product was stable and required no agitation following initial dispersion. The dilute mixture was applied uniformly at the rate of 200 gallons per acre to the foliage of a stand of water grass 3 to 5 inches high and in a condition of succulent and vigorous growth. Spraying was carried out under 10 pounds per squar inch pressure and at an air temperature of 78°–82° F. Five replications were made with good wetting being obtained in all treatments.

Following the application, the treated areas and unsprayed check areas were subjected to intermittent overhead irrigation totalling about ⅓ inch of water over a period of 7 days. At the end of this time all plots were examined. Those treated with a spray composition were found to exhibit an average kill of 85 percent of the water grass. The water grass in control areas continued in a condition of vigorous growth.

EXAMPLE 7

2,4-dinitro-6-secondarybutyl-phenol was melted and the polyglycol ether-alcohol of Example 1 added thereto with stirring to produce a concentrate containing 0.5 pound of the phenolic constituent for each gallon of the ether-alcohol. This concentrate was compared against water grass with the unmodified ether-alcohol and a commercil composition comprising 2,4-dinitro-6-secondarybutyl-phenol in a mixture of aromatic oils and conventional dispersing and solubilizing agents and containing 1.25 pounds of nitro-phenol per quart of concentrate. The test vegetation was 8 to 10 inches high and in dense vigorous stand approaching maturity. Ten replications were made of each application with all materials being applied in 200 gallons of dilute aqueous spray per acre. Application was made at 10 pounds per square inch pressure and at an air temperature of 78°–82° F. The treated areas and untreated spray areas were subjected to intermittent overhead irrigation for a period of 10 days, at the end of which time all plots were examined. The water grass in the check plots continued in a condition of vigorous growth. The following table sets forth the results obtained with various amounts of 2,4-dinitro-6-secondarybutyl-phenol as found in the commercial herbicide concentrate, the concentrate of 0.5 pound of 2,4-dinitro-6-secondarybutyl-phenol per gallon of polyglycol ether-alcohol, and with the polyglycol ether-alcohol:

TREATING COMPOSITION

| Pounds 2,4-dinitro-6-secondarybutyl-phenol per acre | Gallons polyglycol ether-alcohol per acre | Percent Kill |
|---|---|---|
| 0.75 | 0 | 0 |
| 1.0 | 0 | 0 |
| 1.5 | 0 | 30 |
| 0 | 1.5 | 5 |
| 0 | 2.0 | 5 |
| 0 | 3.0 | 5 |
| 1.5 | 3.0 | 80 |

EXAMPLE 8

In exactly similar fashion 2,4-dinitro-6-secondarybutyl-phenol was compounded with the polyglycol ether-alcohol as described in Example 3 to produce a herbicide concentrate. This concentrate was diluted with water and compared with its constituents as to effectiveness in the control of water grass exactly as described in Example 7.

The following table sets forth the results observed on examination of the test plots 10 days after treatment:

TREATING COMPOSITION

| Pounds 2,4-dinitro-6-secondarybutyl-phenol per acre | Gallons polyglycol ether-alcohol per acre | Percent Kill |
| --- | --- | --- |
| 0.75 | 0 | 0 |
| 1.0 | 0 | 0 |
| 1.5 | 0 | 30 |
| 0 | 1.5 | 0 |
| 0 | 2.0 | 0 |
| 0 | 3.0 | 5 |
| 1.5 | 3.0 | 90 |

EXAMPLE 9

The triethanolamine salt of 2,4-dinitro-6-secondary-butyl-phenol and the polyglycol ether-alcohol of Example 3 were warmed and mixed together in such proportion that the resulting concentrate product contained the equivalent of 0.5 pound of the 2,4-dinitro-6-secondary-butyl-phenol per gallon. The resulting composition was a viscous liquid and appeared to be stable. This composition was dispersed in water to obtain a dilute aqueous spray containing 1 gallon of the concentrate per 100 gallons of spray mixture. The spray was then applied uniformly at the rate of 200 gallons per acre to the foliage of a stand of water grass substantially as described in Example 3. The water grass was 3 to 5 inches high and in a condition of succulent and vigorous growth. In other treatments the polyglycol ether-alcohol alone at a dosage of 2 gallons per acre and the triethanolamine salt of 2,4-dinitro-6-secondarybutyl-phenol at a dosage of 1 pound per acre (phenol equivalent) were similarly applied in dilute aqueous spray to adjacent water grass plots. All applications were at the rate of 200 gallons of dilute spray per acre and 5 replications were made of each application.

Seven days after treatment the plots were examined. It was found that those treated with the concentrate of triehanolamine salt of 2,4 - dinitro-6-secondarybutyl-phenol (1 pound per acre phenol equivalent) and the polyglycol ether-alcohol (2 gallons per acre) averaged 97 percent injury. The areas treated with the polyglycol ether-alcohol alone at 2 gallons per acre and the triethanolamine salt alone at 1 pound per acre (phenol equivalent averaged 25 percent injury.

Ten days later a second examination was made. It was found that those plots separately sprayed with the polyglycol ether-alcohol and with the triethanolamine salt had largely recovered from preliminary injury. The plots sprayed with the combination of the materials as supplied in the concentrate composition appeared dead and sere, exhibiting an average kill of approximately 95 percent.

EXAMPLE 10

One mole of cetyl alcohol was reacted with 0.1 mole of finely divided metallic sodium under a blanket of nitrogen at atmospheric pressure and at temperature approximating 100° C. The resulting product was thereafter condensed with 10 moles of ethylene oxide at 130°–150° C. in a closed reactor under autogenous pressure. The crude product was blown with carbon dioxide, washed with water and dried to obtain a readily water-dispersible ether-alcohol product as a waxy solid melting at 28°–30° C.

One mole of 2,4-dinitro-6-secondaryamyl-phenol and 8.0 moles of the above polyglycol ether-alcohol are melted and mixed together to produce a herbicide concentrate in the form of a very viscous liquid adapted to be dispersed in water to produce dilute spray compositions containing from 0.5 to 1.0 pound of 2,4-dinitro-6-secondaryamyl-phenol per gallon. Such dilute aqueous spray is applied to mixed stands of narrowleaf and broadleaf vegetation in the amount of from 200 to 300 gallons per acre to obtain substantially complete kill of such common vegetation as field mustard, knot weed, canary rye grass and the like.

EXAMPLE 11

2,4-dinitro-6-secondarybutyl-phenol was melted and added with stirring to sufficient of the polyglycol ether-alcohol described in Example 3 to obtain a concentrate composition containing 0.5 pound of the 2,4-dinitro-6-secondary-butyl-phenol per gallon of the ether-alcohol. This product was compared in varying dosages with the unmodified polyglycol ether-alcohol and the commercial 2,4-dinitro-6-secondarybutyl-phenol composition described in Example 7. The procedure followed in carrying out this comparative determination was substantially that set forth in Example 7 with the exception that the vegetation concerned was canary rye grass 4 to 5 inches high and in green, vigorous growth. All applications were at the rate of 200 gallons of spray per acre and in 10 replications. Eight days after treatment all plots were examined for injury. The check area had continued in a state of vigorous growth. The following table sets forth the observed results and the dosages employed:

| Gallons polyglycol ether-alcohol per acre | Pounds 2,4-dinitro-6-secondarybutyl-phenol per acre | Percent Injury |
| --- | --- | --- |
| 1.5 | 0 | 3.5 |
| 2.0 | 0 | 12 |
| 3.0 | 0 | 47.5 |
| 4.0 | 0 | 74 |
| 1.0 | 0.5 | 95.5 |
| 1.5 | 0.75 | 100 |
| 2.0 | 1.0 | 100 |
| 3.0 | 1.5 | 100 |
| 4.0 | 2.0 | 100 |
| 0 | 0.5 | 25 |
| 0 | 0.75 | 31 |
| 0 | 1.0 | 56 |
| 0 | 1.5 | 71 |
| 0 | 2.0 | 90 |
| Check | ---------- | 0 |

EXAMPLE 12

The following compositions illustrate other concentrates comprising the polyglycol alkyl ether-alcohols and 2,4-dinitro-phenols adapted to be employed in aqueous dispersion in biochemical control operations. In the preparation of these concentrates, the dinitro-phenol and indicated ether-alcohol are warmed and stirred together. Relatively stable aqueous dispersions of the resulting viscous liquid or low melting products are obtained by mixing the appropriate amount of concentrate with sufficient water to obtain the desired volume of spray.

Composition 1

0.5 pound (0.97 mole)—2,4-dinitro-6-isopropyl-phenol
8.0 pounds (4.4 moles)—dodecyl alcohol condensation product with 5 moles of propylene oxide followed by 8 moles of ethylene oxide

Composition 2

0.5 pound (0.95 mole)—2,4-dinitro-6-secondary-butyl-phenol
8.0 pounds (6.2 moles)—dodecyl alcohol condensation product with 9 moles of ethylene oxide

Composition 3

0.5 pound (0.95 mole)—2,4-dinitro-6-tertiarybutyl-phenol
8.0 pounds (5.7 moles)—tridecyl alcohol condensation product with 3 moles of propylene oxide followed by 6 moles of ethylene oxide

Composition 4

0.5 pound (0.95 mole)—2,4-dinitro-6-secondarybutyl-phenol
8.0 pounds (4.9 moles)—tridecyl alcohol condensation product with 4 moles of propylene oxide followed by 7 moles of ethylene oxide

Composition 5

0.5 pound (0.95 mole)—2,4-dinitro-6-normalbutyl-phenol
8.0 pounds (6.0 moles)—tetradecyl alcohol condensation product with 9 moles of ethylene oxide

Composition 6

0.5 pound (0.95 mole)—2,4-dinitro-6-secondarybutyl-phenol
8.0 pounds (5.2 moles)—pentadecyl alcohol condensation product with 1 mole of propylene oxide followed by 8 moles of ethylene oxide

Composition 7

0.5 pound (0.95 mole)—2,4-dinitro-6-secondarybutyl-phenol
8.0 pounds (5.3 moles)—hexadecyl alcohol condensation product with 10 moles of ethylene oxide

Composition 8

0.5 pound (0.95 mole)—2,4-dinitro-6-secondarybutyl-phenol
8.0 pounds (4.8 moles)—hexadecyl alcohol condensation product with 2 moles of propylene oxide followed by 9 moles of ethylene oxide

We claim:

1. A composition of matter comprising a component (1) which is a 2,4-dinitro-6-alkyl-phenol of the formula

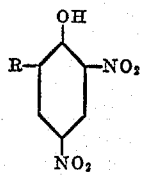

wherein R represents an alkyl radical containing from 3 to 5 carbon atoms, inclusive, and a component (2) which is a polyglycol alkyl ether-alcohol compound of the formula

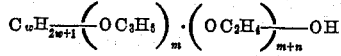

wherein $w$ represents 12 to 16, inclusive, $m$ represents from 0 to 5, inclusive, $n$ represents from 3 to 10, inclusive, and the total number of alkylene oxide groups in the molecule is between 9 and 13, inclusive, and containing at least about 4 moles of component (2) for each mole of component (1).

2. A composition in accordance with claim 1 containing from 4 to 21 moles of component (2) for each mole of component (1).

3. A composition in accordance with claim 1 containing from 5 to 12 moles of component (2) for each mole of component (1).

4. A composition in accordance with claim 1 wherein component (1) is 2,4-dinitro-6-secondarybutyl-phenol.

5. A composition in accordance with claim 1 wherein the component (2) is a polyglycol ether-alcohol of tridecyl alcohol.

6. A composition in accordance with claim 1 wherein component (2) has the formula

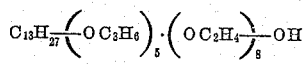

7. A composition in accordance with claim 1 wherein component (2) has the formula

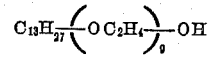

8. A spray composition comprising a dilute aqueous dispersion of a concentrate comprising a component (1) which is a 2,4-dinitro-6-alkyl-phenol of the formula

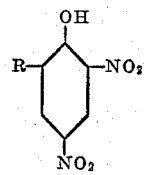

wherein R represents an alkyl radical containing from 3 to 5 carbon atoms, inclusive, and a component (2) which is a polyglycol alkyl ether-alcohol compound of the formula

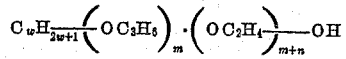

wherein $w$ represents from 12 to 16, inclusive, $m$ represents from 0 to 5, inclusive, $n$ represents from 3 to 10, inclusive, and the total number of alkylene-oxide groups in the molecule is between 9 and 13, inclusive, and containing at least about 4 moles of component (2) for each mole of component (1), and in which spray composition the concentration of 2,4-dinitro-6-alkyl-phenol is at least 0.5 pound per 100 gallons.

References Cited in the file of this patent

UNITED STATES PATENTS

| | | |
|---|---|---|
| 2,174,761 | Schuette et al. | Oct. 3, 1939 |
| 2,392,859 | Meuli | Jan. 15, 1946 |
| 2,556,665 | Smith et al. | June 12, 1951 |
| 2,623,818 | Hanson et al. | Dec. 30, 1952 |